UNITED STATES PATENT OFFICE.

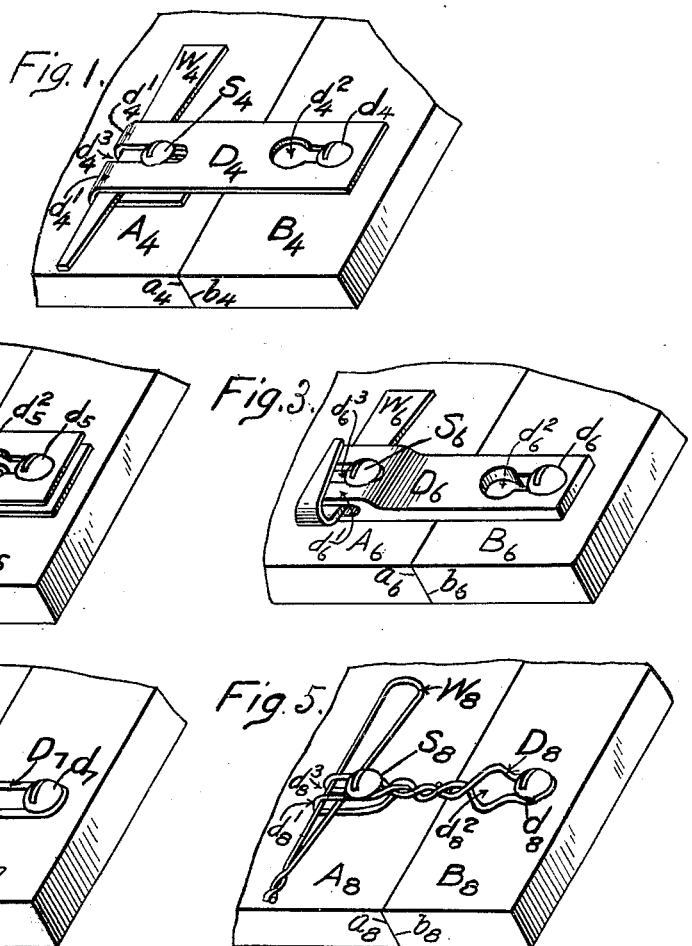

GEORGE P. WOOD, OF PEEKSKILL, NEW YORK.

BOX-FASTENER.

1,136,500.  Specification of Letters Patent.  Patented Apr. 20, 1915.

Application filed March 12, 1912. Serial No. 683,288.

*To all whom it may concern:*

Be it known that I, GEORGE P. WOOD, a citizen of the United States, residing at No. 217 Walnut street, in the village of Peekskill, county of Westchester, and State of New York, have invented a new and useful Box-Fastener, of which the following is a specification.

The object of my invention is to produce at moderate cost, efficient and convenient devices for clamping, fastening, connecting or locking parts of such articles as beehives, boxes, crates, woodwork, and metal work.

My invention consists in the construction hereinafter pointed out.

Figures 1 to 5, each of which shows the invention, are isometric drawings which illustrate varied forms and applications of the invention.

In these figures similar letters refer to similar parts throughout. The subscript figures are the numbers of the drawings upon which same appear.

A and B represent the parts to be clamped at the edges $a$ and $b$. These may lie in one plane or making any angle with each other.

S and D are the parts having indirectly opposing and overlapping hooked or looped projections which are attached to or form portions of A and B respectively.

W is the wedge which engages the indirectly opposing and overlapping hooked or looped projections on S and D and thereby forces the parts A and B into position. There are several ways of securing the wedge in place. Each figure shows one wedge, one projection on the part S and two projections on the part D, but the invention is not necessarily limited to these forms. The invention is not limited to the methods shown for attaching the parts of clamp S and D to the parts A and B to be clamped. Any other usual method of attaching may be employed, and in fact the parts S and D may in some instances be portions of A and B, respectively, as in the case of sheet metal work and castings. It is evident that in order for the wedge to exert force on S and D these parts must be spaced properly and that the wedge should be of such size as to admit of some unavoidable variation in this spacing. It is also important that the wedge be of the proper thickness relative to the space in the hooks or loops through which it passes to slide readily and at the same time prevent unnecessary motion.

Fig. 1 shows the part $S_4$ equivalent to a screw or nail, the head of same forming the hooked projection. The slot $d_4^3$ may be made so narrow that the part $D_4$ cannot be removed from $S_4$ except by sliding endwise after removing the wedge $W_4$. The part $D_4$ also has the enlarged slots and openings $d^2$ one end being large enough to slip over the head of the part $S_4$. If the part $D_4$ is of thin metal the whole clamp may be held firmly in position after the wedge is in place by tightening the screw or nail $S_4$, thereby bending the part $D_4$ and clamping the wedge $W_4$. If desired $S_4$ may consist of a loop instead of a screw or nail.

Fig. 2 shows a clamp like that in Fig. 4 except that the part $D_5$ is a complete loop from the point of attaching, $d_5$.

Fig. 3 shows a looped or slotted form for the part $D_6$ such as could readily be made of cast metal, while all of the foregoing are well suited for manufacture from stamped sheet metal. This figure also shows a method of securing the wedge in position by simply doubling the end of same back over itself and back over the clasp. This feature is applicable to all forms of the invention shown.

Fig. 4 shows the parts $D_7$ and $W_7$ as they may be made of wire.

Fig. 5 shows a more complete looped form of $D_8$ as it may be made of wire. This corresponds in nearly every other respect to Fig. 3.

In all these forms, there are four distinct features, two engaging portions, shown in the form of screws or nails, which are to be secured to the meeting parts of the object to be held closed, the locking member engaging these catches and extending from one to the other and the wedge for locking the locking member in place. The clasp may be so constructed at one end that it may be slipped over the head of the screw or nail and then slid so as to be caught under this head and at the other end so that it may be slid under the head of the catch at that end. This construction enables either the clamp or fastener to be used for meeting edges which are either swung or slid into relation with each other.

Having described my invention, what I claim is:

1. A clamp or fastener consisting of four distinct features, two engaging portions having heads, a locking member adapted to slide under and engage these heads and a wedge adapted to bind between one end of the locking member and its engaging catch.

2. A clamp or fastener consisting of four distinct features, two engaging portions having heads, a locking member adapted to slide under and engage these heads, one end of the locking member having an enlarged opening and a wedge adapted to bind between one end of the locking member and its engaging catch.

3. A clamp or fastener consisting of four distinct features, two engaging portions having heads, a locking member adapted to slide under and engage these heads, one end of the locking member having an enlarged opening and a wedge adapted to bind between one end of the locking member and its engaging catch and double upon itself and back over the clasp.

GEORGE P. WOOD.

Witnesses:
LESLIE G. HOLLNAN,
WALTER L. UNDERHILL.

Copies of this patent may be obtained for five cents each, by addressing the "Commissioner of Patents, Washington, D. C."